(12) United States Patent
Gotou

(10) Patent No.: US 11,604,375 B2
(45) Date of Patent: Mar. 14, 2023

(54) DISPLAY DEVICE COMPRISING A CHASSIS HAVING A GROOVE PORTION RECESSED IN A DIRECTION OPPOSITE TO A DIFFUSER PLATE

(71) Applicant: SHARP KABUSHIKI KAISHA, Sakai (JP)

(72) Inventor: Akira Gotou, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/329,889

(22) Filed: May 25, 2021

(65) Prior Publication Data

US 2021/0389624 A1    Dec. 16, 2021

(30) Foreign Application Priority Data

Jun. 15, 2020 (JP) .............................. JP2020-102833
Feb. 19, 2021 (JP) .............................. JP2021-024730

(51) Int. Cl.
*G02F 1/1333* (2006.01)
*G02F 1/1335* (2006.01)
*G02F 1/13357* (2006.01)

(52) U.S. Cl.
CPC .. *G02F 1/133308* (2013.01); *G02F 1/133504* (2013.01); *G02F 1/133553* (2013.01); *G02F 1/133608* (2013.01)

(58) Field of Classification Search
None
See application file for complete search history.

(56) References Cited

U.S. PATENT DOCUMENTS

| | | | |
|---|---|---|---|
| 2012/0063122 A1 | 3/2012 | Yokota et al. | |
| 2013/0021538 A1* | 1/2013 | Kuromizu | G02F 1/133604 362/614 |
| 2013/0128128 A1* | 5/2013 | Ikuta | G02F 1/133603 348/790 |

FOREIGN PATENT DOCUMENTS

| | | | | |
|---|---|---|---|---|
| CN | 206807764 U | * | 12/2017 | ............. H04R 7/045 |
| JP | 5021102 B1 | * | 9/2012 | ............... G09F 9/00 |
| KR | 100962633 B1 | * | 6/2010 | |
| WO | 2010/146895 A1 | | 12/2010 | |

* cited by examiner

*Primary Examiner* — Paul C Lee
(74) *Attorney, Agent, or Firm* — ScienBiziP, P.C.

(57) ABSTRACT

A display device includes a diffuser plate, a plurality of light sources that irradiates the diffuser plate with light, a mounting substrate on which the plurality of light sources is mounted, a chassis to which the mounting substrate is secured, and a support member that is disposed between the chassis and the diffuser plate and that supports the diffuser plate. The support member includes a securing pin that is fitted in a hole that is formed in the mounting substrate, a support pin that is located between the diffuser plate and the chassis, and a coupling portion that extends in a plane direction of the mounting substrate and that couples the securing pin and the support pin with each other.

4 Claims, 8 Drawing Sheets

DISPLAY DEVICE COMPRISING A CHASSIS HAVING A GROOVE PORTION RECESSED IN A DIRECTION OPPOSITE TO A DIFFUSER PLATE

BACKGROUND

1. Field

The present disclosure relates to a display device.

2. Description of the Related Art

An existing display device that includes support pins (support members) that support a diffuser plate is disclosed (see, for example, International Publication No. 2010/146895).

The display device disclosed in International Publication No. 2010/146895 includes the diffuser plate, a light source, and the support pins. The light source irradiates the diffuser plate with light. In the light source, light-emitting modules are arranged in a lattice pattern on a chassis. The support pins are dotted on the chassis.

SUMMARY

The support pins disclosed in International Publication No. 2010/146895 are disposed so as to extend through through-holes that are formed in a mounting substrate. Accordingly, the positions of the support pins are limited to the positions of the through-holes of the mounting substrate.

It is desirable to provide a display device that enables the degree of freedom of the positions of support members to be increased.

A display device according to an aspect of the present disclosure includes a diffuser plate, a plurality of light sources that irradiates the diffuser plate with light, a mounting substrate on which the plurality of light sources is mounted, a chassis to which the mounting substrate is secured, and a support member that is disposed between the chassis and the diffuser plate and that supports the diffuser plate. The support member includes a securing pin that is fitted in a hole that is formed in the mounting substrate, a support pin that is located between the diffuser plate and the chassis, and a coupling portion that extends in a plane direction of the mounting substrate and that couples the securing pin and the support pin with each other.

DESCRIPTION OF THE EMBODIMENTS

Embodiments and modifications are described below just by way of example of the present disclosure, and the present disclosure is not limited to the embodiments and the modifications. Various modifications that differ from the embodiments and the modifications can be made depending on, for example, designs without departing from the technical spirit of the present disclosure.

First Embodiment

Figure 1:
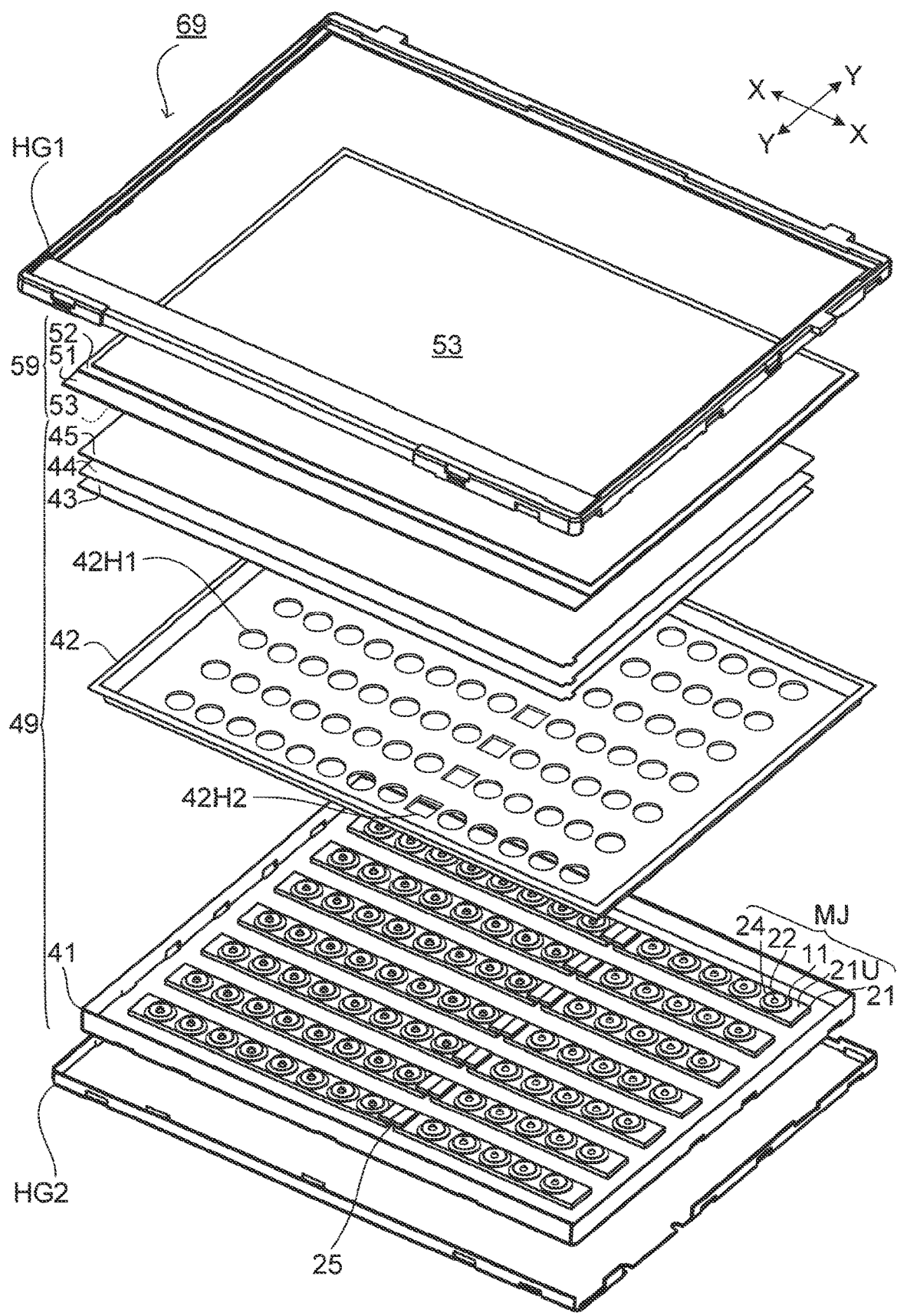
FIG. 1 is an exploded perspective view of a display device according to a first embodiment.

A display device 69 according to the present embodiment will be described with reference to FIG. 1 to FIG. 4. The display device 69 illustrated in FIG. 1 is horizontally disposed with a display surface facing upward.

A liquid-crystal display panel 59 is used as a display panel for the display device 69. The liquid-crystal display panel 59 and a back light unit 49 that illuminates the liquid-crystal display panel 59 from behind are contained in a single housing. The housing includes a front housing member HG1 and a back housing member HG2.

The liquid-crystal display panel 59 is obtained in a manner in which an active matrix substrate 51 that includes a switching element such as a thin-film transistor (a TFT) and a facing substrate 52 that faces the active matrix substrate 51 are bonded to each other with a sealing material that is not illustrated interposed therebetween, and a liquid crystal is injected between the active matrix substrate 51 and the facing substrate 52.

Polarizing films 53 are bonded to a light-receiving surface of the active matrix substrate 51 and an exit surface of the facing substrate 52. The liquid-crystal display panel 59 forms an image by using a change in light transmittance due to the tilt of liquid crystal molecules.

The back light unit 49 includes light-emitting modules MJ, a chassis 41, a reflection sheet 42 that is large, a diffuser plate 43, a prism sheet 44, and a microlens sheet 45.

Each light-emitting module MJ includes a mounting substrate 21, light sources 22, diffusion lenses 24, and built-in reflection sheets 11. Each light source 22 is, for example, a light emitting element such as a light emitting diode (a LED).

Each mounting substrate 21 has a rectangular plate shape. The mounting substrate 21 includes electrodes (not illustrated) that are formed at predetermined intervals in a longitudinal direction on a mounting surface 21U that is an upper surface. The light sources 22 are mounted on the electrodes on the mounting surface 21U of the mounting substrate 21. Examples of the light sources 22 can include a light source that obtains white light by combining three LED chips that emit light of different colors.

The mounting substrates 21 are arranged on the chassis 41 in an X-direction corresponding to the longitudinal direction of the mounting substrates 21 and in a Y-direction corresponding to the transverse direction of the mounting substrates 21. According to the present embodiment, the number of the mounting substrates 21 on the chassis 41 is 14, which are arranged two by two in the X-direction and seven by seven in the Y-direction. Five light sources 22 are mounted on each of seven mounting substrates 21 of the 14 mounting substrates 21, and eight light sources 22 are mounted on each of the other seven mounting substrates 21. Each of the seven mounting substrates 21 on which the five light sources 22 are mounted is arranged in the Y-direction. Each of the seven mounting substrates 21 on which the eight light sources 22 are mounted is arranged in the Y-direction. A set of each of the seven mounting substrates 21 on which the five light sources 22 are mounted and a set of each of the seven mounting substrates 21 on which the eight light sources 22 are mounted are arranged in the X-direction. Two mounting substrates 21 that are arranged in the X-direction are coupled with each other by using a connector 25 that is disposed between end portions of the mounting substrates 21 in the longitudinal direction. The mounting substrates 21 are secured to the chassis 41 by a method such as crimping, adhesion, screwing, or riveting. Since the mounting substrates 21 are arranged in the X-direction and in the Y-direction, the light sources 22 that are mounted on the mounting substrates 21 are arranged in a lattice pattern on the chassis 41.

The diffusion lenses 24 cover the respective light sources 22. The diffusion lenses 24 diffuse light from the light sources 22.

The built-in reflection sheets 11 are disposed between the mounting substrates 21 and the diffusion lenses 24. The built-in reflection sheets 11 are secured to the mounting surfaces 21U so as to face the lower surfaces of the diffusion lenses 24. The built-in reflection sheets 11 are foamed resin sheets and have a light reflectance higher than those of the mounting surfaces 21U of the mounting substrates 21. The built-in reflection sheets 11 have a circular planar shape and are concentric with the diffusion lenses 24. The diameters of the built-in reflection sheets 11 are larger than those of the diffusion lenses 24. The built-in reflection sheets 11 have through-holes through which leg portions 24a of the diffusion lenses 24 extend.

The reflection sheet 42 is disposed above the chassis 41 so as to overlap the chassis 41. A planar shape of the reflection sheet 42 is similar to that of the chassis 41. The reflection sheet 42 is a foamed resin sheet as in the built-in reflection sheets 11. The reflection sheet 42 has circular openings 42H1 at positions corresponding to those of the diffusion lenses 24. The openings 42H1 have a size that enables the diffusion lenses 24 to extend therethrough but does not enable the built-in reflection sheets 11 to extend therethrough. That is, the diameters of the openings 42H1 are larger than the diameters of the diffusion lenses 24 and are smaller than the diameters of the built-in reflection sheets 11. The reflection sheet 42 has rectangular openings 42H2 through which the connectors 25 extend.

Figure 2:
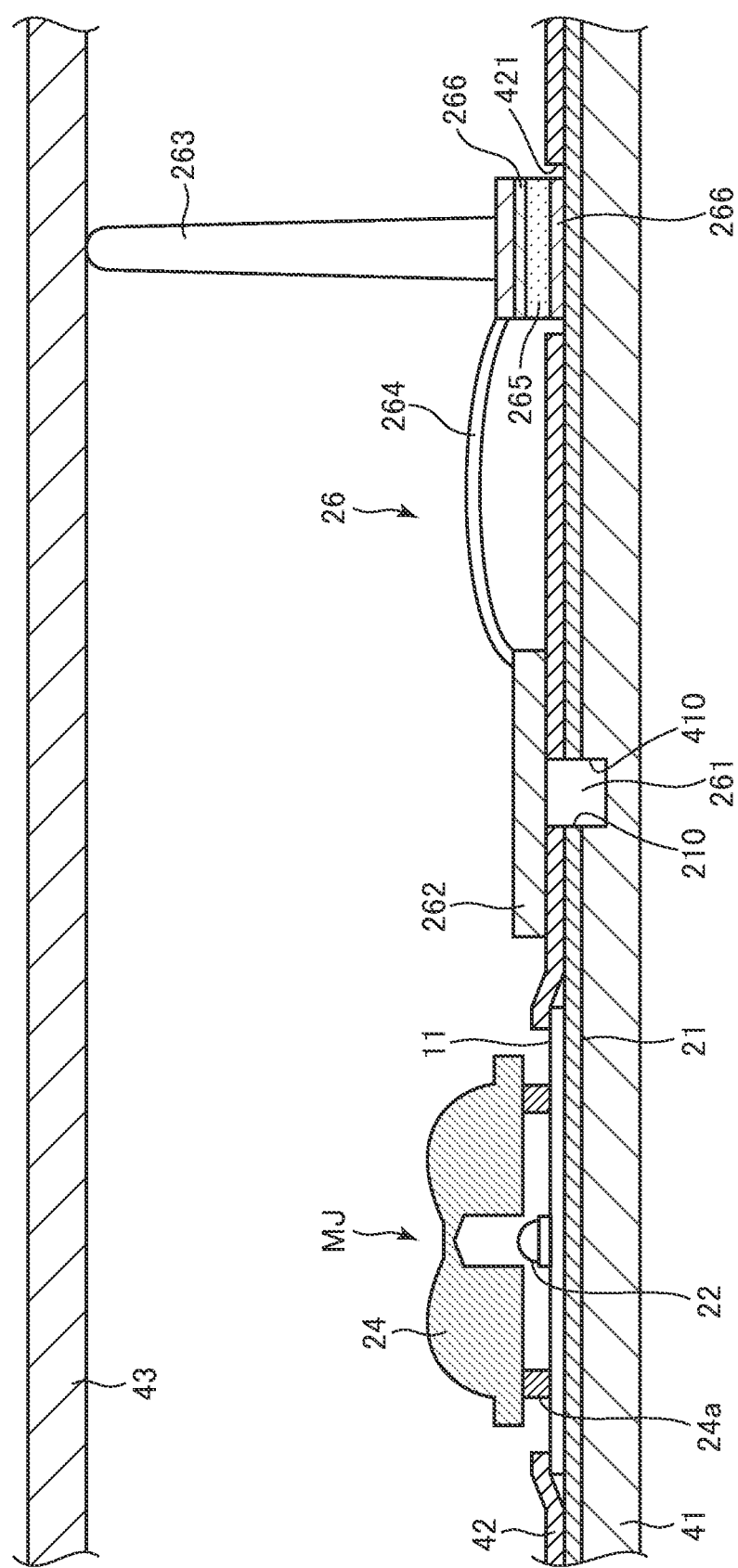
FIG. 2 is an enlarged sectional view of the display device.

As illustrated in FIG. 2, support members 26 that support the diffuser plate 43 are disposed between the chassis 41 and the diffuser plate 43. In FIG. 1, an illustration of the support members 26 is omitted.

The support members 26 are disposed on the mounting substrates 21, are interposed between the mounting substrates 21 and the diffuser plate 43, consequently support the diffuser plate 43, and maintain a predetermined distance between each mounting substrate 21 and the diffuser plate 43. Consequently, the distance between each light source 22 and the diffuser plate 43 is uniform, and luminance unevenness due to the light source 22 is inhibited.

Each support member 26 may include a securing pin 261, a flange portion 262, a support pin 263, and a coupling portion 264. The support member 26 is composed of, for example, resin such as polycarbonate resin. The securing pin 261, the flange portion 262, the support pin 263, and the coupling portion 264 are integrally formed.

The securing pin 261 has a columnar shape and extends through a hole 210 that is formed in the mounting substrate 21. The securing pin 261 extends through the hole 210 of the mounting substrate 21 and is consequently secured to the mounting substrate 21. The chassis 41 has a groove 410 that has a bottom and that faces the hole 210 of the mounting substrate 21. The securing pin 261 is fitted in the hole 210 of the mounting substrate 21 and the groove 410 of the chassis 41. Consequently, the securing pin 261 also has a function of securing the mounting substrate 21 to the chassis 41.

The flange portion 262 may be formed at an end portion of the securing pin 261 and restricts the position of the securing pin 261. The flange portion 262 is formed so as to expand from the end portion of the securing pin 261 and has a diameter larger than the diameter of the hole 210. The flange portion 262 faces the mounting surface 21U of the mounting substrate 21.

The support pin 263 has a cone shape having a curved end. The height of the support pin 263 is, for example, about 20 mm to 30 mm. The support pin 263 is disposed above the mounting surface 21U of the mounting substrate 21 so as to be interposed between the diffuser plate 43 and the mounting substrate 21, and the end is in contact with the diffuser plate 43. The surface of the support pin 263 has white color and reflects the light from the light sources 22. The support pin 263 may be translucent such that the light from the light sources 22 passes therethrough. For example, the support pin 263 may be transparent.

The coupling portion 264 extends in a plane direction of the mounting substrate 21. In other words, the coupling portion 264 extends along the mounting surface 21U of the mounting substrate 21 on which the light sources 22 are mounted. The coupling portion 264 couples the securing pin 261 and the support pin 263 with each other. According to the present embodiment, an end of the coupling portion 264 is continuous with the end portion of the securing pin 261 with the flange portion 262 interposed therebetween. The other end of the coupling portion 264 is continuous with a bottom portion of the support pin 263.

As for each support member 26 according to the present embodiment, the support pin 263 can be disposed on the circumference of a circle the center of which is located at the securing pin 261 that is fitted in the hole 210 of the mounting substrate 21 and the diameter of which is equal to a dimension of the coupling portion 264. Consequently, the degree of freedom of arrangement of the support pin 263 of the support member 26 according to the present embodiment is higher than that of, for example, a support member that includes a securing pin and a support pin that are coaxial with each other. Accordingly, the distance between the support pin 263 and each light source 22 can be adjusted, and shadow due to the support pin 263 can be inhibited.

Figure 3:
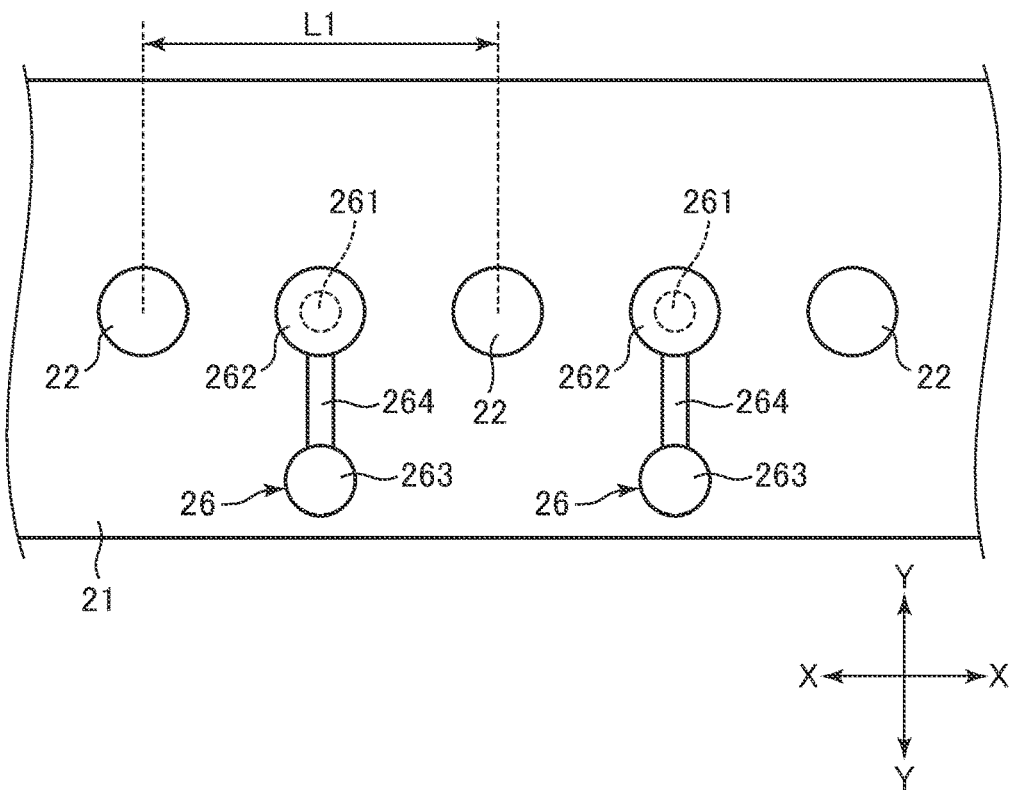
FIG. 3 schematically illustrates a first example of arrangement of support members of the display device.
Figure 4:
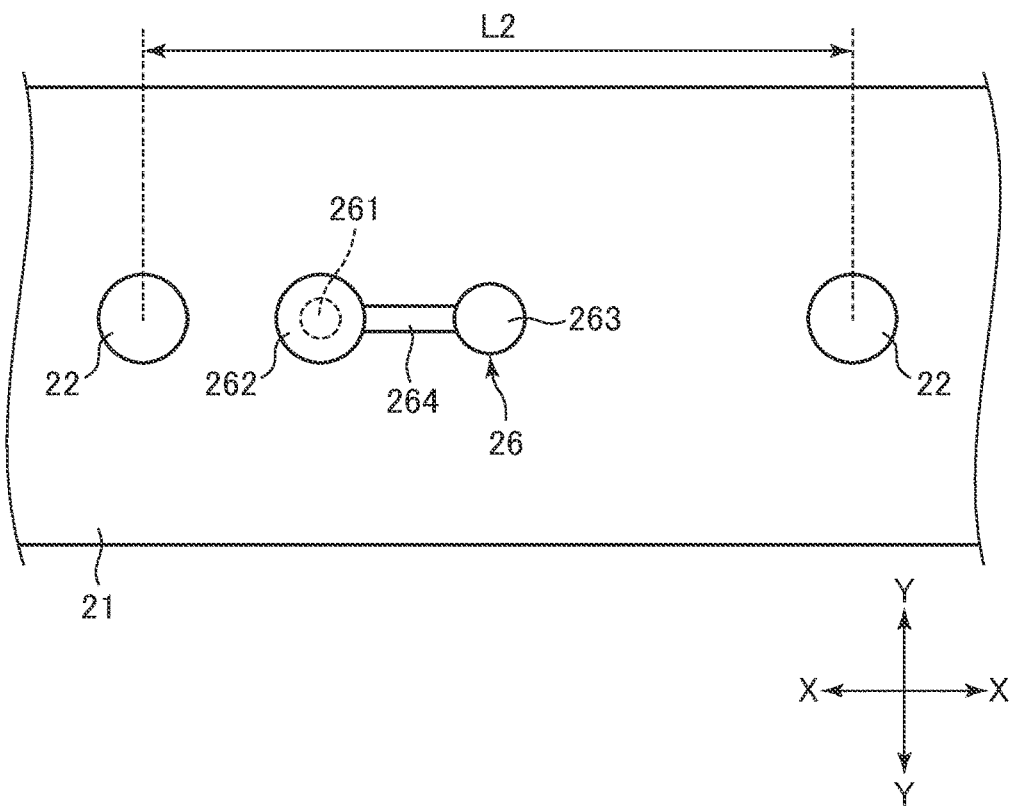
FIG. 4 schematically illustrates a second example of arrangement of the support members of the display device.

For example, as illustrated in FIG. 3, the hole 210 in which the securing pin 261 of one of the support members 26 is fitted is formed at the center between two light sources 22 in the direction (the X-direction) in which the light sources 22 are arranged on the mounting substrate 21. In this case, the support member 26 is disposed such that the support pin 263 is located with respect to the securing pin 261 in the direction (the Y-direction) perpendicular to the X-direction in which the light sources 22 are arranged. This enables the distances between the two light sources 22 and the support pin 263 can be uniform, and the shadow due to the support pin 263 can be unlikely to stand out.

In some cases, the number of the light sources 22 that are mounted on the mounting substrates 21 changes depending on the specification of the display device 69. In these cases, the distance between the light sources 22 that are mounted on the mounting substrates 21 changes. For example, the light sources 22 are mounted on electrodes that are arranged in the X-direction such that an electrode on which the light source 22 is mounted and an electrode on which the light source 22 is not mounted are alternately arranged, and this achieves the distance between the light sources 22 by using the common mounting substrates 21. In an example illustrated in FIG. 3, the distance between the two light sources 22 that are arranged in the X-direction is L1. In an example illustrated in FIG. 4, the distance between the two light sources 22 that are arranged in the X-direction is L2. The distance L2 is twice the distance L1. A dimension of the coupling portion 264 is equal to about the half of the distance L1. In the example illustrated in FIG. 4, the support member 26 is disposed such that the support pin 263 is located with respect to the securing pin 261 in the X-direction in which the light sources 22 are arranged. This enables the distances between the two light sources 22 and the support pin 263 to be uniform, and the shadow due to the support pin 263 can be unlikely to stand out.

As illustrated in FIG. 2, the reflection sheet 42 according to the present embodiment may have insertion holes 421 through which the support pins 263 extend. The insertion holes 421 are circular and have diameters slightly larger than the diameters of the bottom surfaces of the respective support pins 263. The insertion holes 421 of the reflection sheet 42 make the positions of the support pins 263 clear. Accordingly, the support pins 263 can be disposed at predetermined positions at which the shadow is unlikely to stand out by using the reflection sheet 42 that is suitable for the number of the light sources 22 that are mounted on the mounting substrates 21, and the efficiency of assembly of the display device 69 can be improved.

Each support member 26 according to the present embodiment may further include an elastic portion 265 and a pair of adhesive portions 266.

The elastic portion 265 is composed of, for example, resin foam such as polyurethane foam and is elastic. The elastic portion 265 has a columnar shape and has an end surface having substantially the same dimensions as those of the bottom surface of the support pin 263. The elastic portion 265 is disposed between the bottom surface of the support pin 263 and the mounting surface 21U of the mounting substrate 21.

Examples of the adhesive portions 266 include a double-side tape. The adhesive portions 266 are disposed on both end surfaces of the elastic portion 265. The bottom surface of the support pin 263 and one of both end surfaces of the elastic portion 265 adhere to each other with the one of the adhesive portions 266. The mounting surface 21U of the mounting substrate 21 and the other end surface of the elastic portion 265 adhere to each other with the other adhesive portion 266.

Since the support pin 263 adheres to the mounting substrate 21 with the adhesive portions 266, the support pin 263 can be inhibited from being out of place due to, for example, a vibration or an impact.

In some cases, the chassis 41 warps due to, for example, heat, and the distance between each mounting substrate 21 and the diffuser plate 43 changes. According to the present embodiment, the elastic portion 265 is disposed between the support pin 263 and the mounting substrate 21. Accordingly, the deformation of the elastic portion 265 absorbs the change in the distance between each mounting substrate 21 and the diffuser plate 43, and the support pin 263 is inhibited from applying excess pressure to the diffuser plate 43. This inhibits the diffuser plate 43 from being damaged.

Modification

A modification to the display device 69 will now be described. The modification described below can be used by appropriately combining features of the embodiment described above or the modification. In the following description, components like to those according to the embodiment described above are designated by like reference characters, and the description thereof is appropriately omitted.

Figure 5:
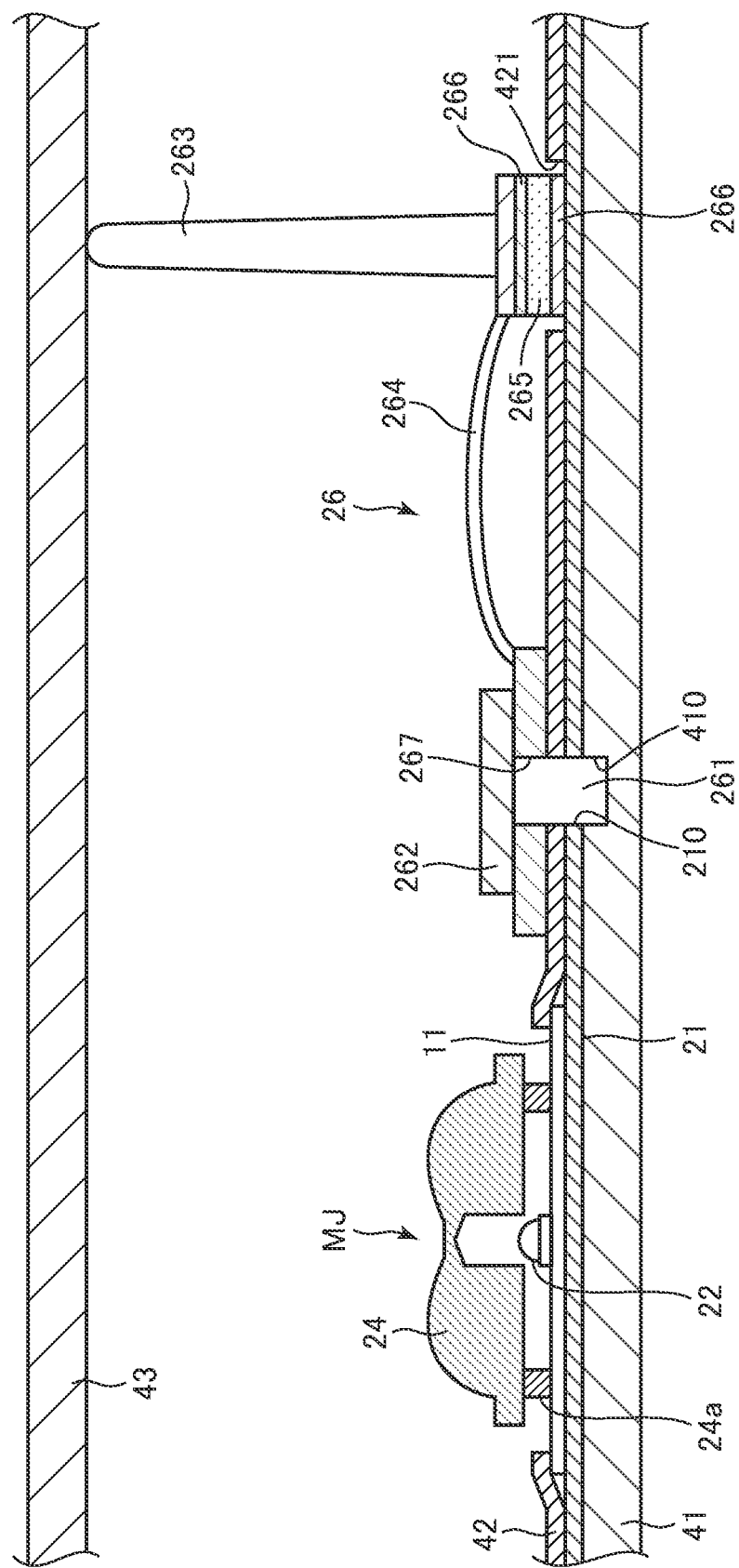
FIG. 5 is an enlarged sectional view of a display device according to a modification to the first embodiment.

As for each support member 26 described by way of example, the coupling portion 264 is integrally formed with the securing pin 261 and the support pin 263 but may be separatable from the securing pin 261, the support pin 263, or both. For example, as illustrated in FIG. 5, the coupling portion 264 may be separatable from the securing pin 261. According to the present modification, a through-hole 267 is formed in an end portion of the coupling portion 264, and the opposite end of the coupling portion 264 is continuous with the support pin 263. The securing pin 261 extends through the through-hole 267. That is, the securing pin 261 is fitted in the through-hole 267 of the coupling portion 264, the hole 210 of the mounting substrate 21, and the groove 410 of the chassis 41. Consequently, the coupling portion 264 and the securing pin 261 are mechanically connected to each other.

According to the present modification, the coupling portion 264 and the securing pin 261 are separatable from each other. Accordingly, the use of the coupling portion 264 depending on the specification of the display device 69 enables the securing pin 261 to be shared with different specifications.

According to the present modification, the coupling portion 264 is integrally formed with the support pin 263 and is separatable from the securing pin 261 but may be integrally formed with the securing pin 261 and may be separatable from the support pin 263, or may be separatable from the securing pin 261 and the support pin 263.

In the example described above, the adhesive portions 266 are disposed on both end surfaces of the elastic portion 265. However, the pair of the adhesive portions 266 may not be included in each support member 26, and only one of the adhesive portions 266 may be included, or the pair of adhesive portions 266 may be omitted.

In the example described above, the elastic portion 265 is disposed between the support pin 263 and the mounting substrate 21. However, the elastic portion 265 may not be included in each support member 26. The elastic portion 265 may be omitted.

In the example described above, the reflection sheet 42 has the insertion holes 421 through which the support pins 263 extend. However, the insertion holes 421 may not be formed. The support pins 263 may be included in the mounting substrates 21 with the reflection sheet 42 interposed therebetween. In this case, the reflection sheet 42 may have, for example, marks that represent the positions of the support pins 263.

Second Embodiment

As for a display device 69 according to a second embodiment, the structures of support members 26A differ from those of the support members 26 according to the first embodiment. Differences between the support members 26A according to the second embodiment and the support members 26 according to the first embodiment will be described below. Like components are designated by like reference characters, and the description thereof is appropriately omitted.

Figure 6:
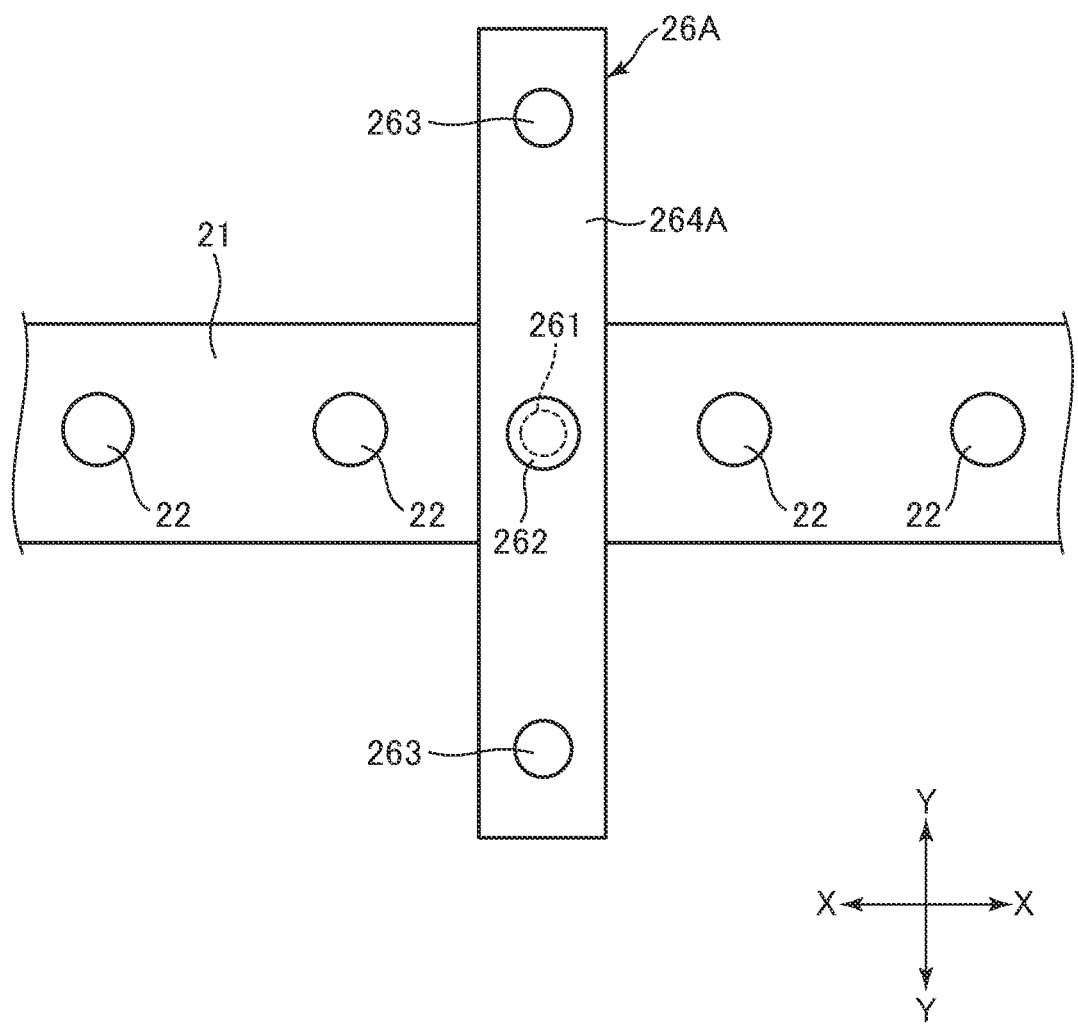
FIG. 6 schematically illustrates a support member of a display device according to a second embodiment.

As illustrated in FIG. 6, each support member 26A according to the present embodiment may include the securing pin 261, the flange portion 262, the support pins 263, and a coupling portion 264A.

As for each support member 26A according to the present embodiment, the support pins 263 and the coupling portion 264A are integrally formed. As for the support member 26A, the securing pin 261 and the flange portion 262 are separatable from the coupling portion 264A.

The coupling portion 264A has a rectangular plate shape. The coupling portion 264A has a through-hole at the center in the longitudinal direction. The securing pin 261 extends through the through-hole of the coupling portion 264A. That is, the securing pin 261 is fitted in the through-hole of the coupling portion 264A, the hole 210 (see FIG. 2) of the mounting substrate 21, and the groove 410 (see FIG. 2) of the chassis 41. Consequently, the coupling portion 264A and the securing pin 261 are mechanically connected to each other.

The coupling portion 264A can rotate about the securing pin 261. According to the present embodiment, the longitudinal direction of the coupling portion 264A of each support member 26A may intersect the longitudinal direction (the X-direction) of the mounting substrate 21. More specifically, the longitudinal direction of the coupling portion 264A of the support member 26A coincides with the direction (the Y-direction) perpendicular to the longitudinal direction (the X-direction) of the mounting substrate 21. The coupling portion 264A may extend across the mounting substrate 21. That is, the coupling portion 264A extends from a side of the mounting substrate 21 in the transverse direction (the Y-direction) to another side thereof. The longitudinal direction of the coupling portion 264A of the support member 26A may intersect the longitudinal direction of the mounting substrate 21 at an angle other than 90 degrees.

The support pins 263 are integrally formed with the coupling portion 264A. In other words, the coupling portion 264A couples the support pins 263 with each other. The coupling portion 264A, which is mechanically connected to the securing pin 261, may couple the support pins 263 and the securing pin 261 with each other.

The support pins 263 protrude from the surface of the coupling portion 264A that faces the diffuser plate 43 (see FIG. 2) toward the diffuser plate 43. The support pins 263 are disposed away from the through-hole that is formed at the center of the coupling portion 264A toward respective sides in the longitudinal direction of the coupling portion 264A. According to the present embodiment, each support member 26A includes two support pins 263, that is, multiple support pins 263. One of the support pins 263 is disposed on an end portion of the coupling portion 264A in the longitudinal direction, and the other support pin 263 is disposed on the other end portion. The number of the support pins 263 is not limited to two and may be three or more. For example, the support member 26A may include four support pins 263. In this case, two support pins 263 are disposed away from the through-hole of the coupling portion 264A toward one side in the longitudinal direction of the coupling portion 264A and are arranged in the longitudinal direction of the coupling portion 264A, and the other two support pins 263 are disposed away therefrom toward the other side and are arranged in the longitudinal direction of the coupling portion 264A.

As illustrated in FIG. 6, the longitudinal direction of the coupling portion 264A is perpendicular to the longitudinal direction of the mounting substrate 21. Accordingly, the support pins 263 are located outside the mounting substrate 21 and may be interposed between the chassis 41 and the diffuser plate 43 (see FIG. 7).

As for each support member 26 according to the first embodiment, the coupling portion 264 may be elongated, and the support pin 263 may be located outside the mounting substrate 21 and may be interposed between the chassis 41 and the diffuser plate 43 as in each support member 26A according to the present embodiment.

Figure 7:
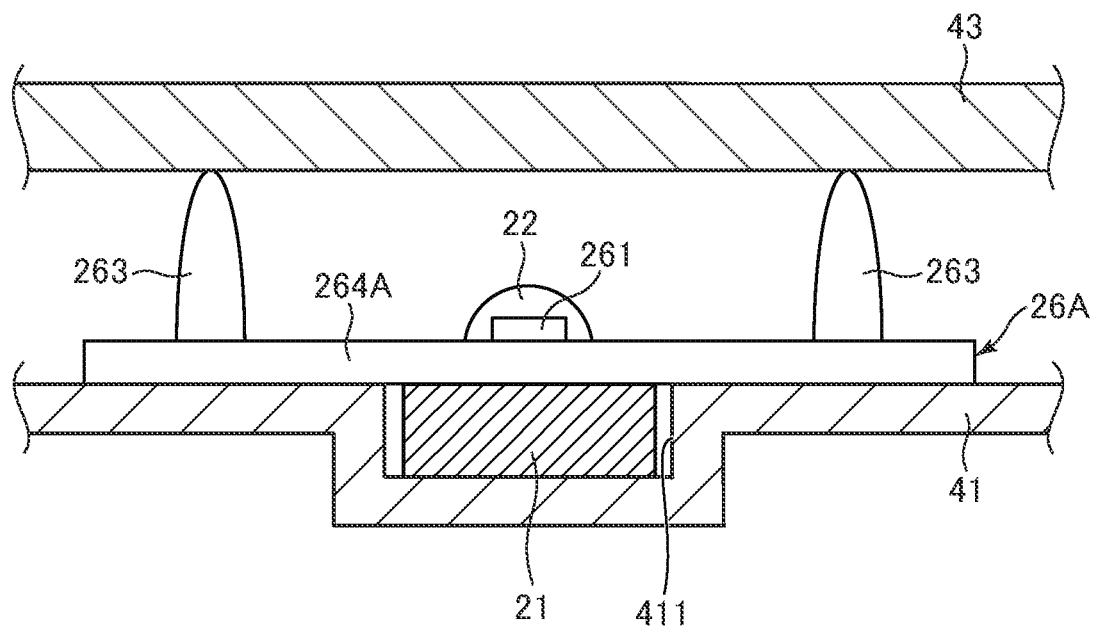
FIG. 7 is a schematic sectional view of a mounting substrate and a chassis of the display device.

The distance between each support pin 263 and the chassis 41 is preferably uniform in order to maintain a predetermined distance between each mounting substrate 21 that is secured to the chassis 41 and the diffuser plate 43. According to the present embodiment, as illustrated in FIG. 7, the chassis 41 may include grooved portions 411. The grooved portions 411 are recessed so as to be away from the diffuser plate 43. The chassis 41 includes the grooved portions 411, and the grooved portions 411 and the mounting substrates 21 have a one-to-one relationship. The dimensions of the grooved portions 411 in the X-direction and in the Y-direction are larger than the dimensions of the respective mounting substrates 21 in the X-direction and in the Y-direction. The depths of the grooved portions 411 are substantially equal to the thicknesses of the mounting substrates 21 or are slightly greater than the thicknesses of the mounting substrates 21. The mounting substrates 21 may be disposed inside the respective grooved portions 411.

The coupling portion 264A bridges the grooved portion 411 from one side in the Y-direction to the other side. Accordingly, parts of the coupling portion 264A in which the support pins 263 are disposed are located outside the grooved portion 411 and can be in contact with the chassis 41. This enables the distance between each support pin 263 according to the present embodiment and the chassis 41 to be uniform and enables the predetermined distance between each mounting substrate 21 and the diffuser plate 43 to be maintained.

Each support member 26A according to the present embodiment thus includes the support pins 263. Accordingly, work efficiency can be improved more than the case where the support member 26A includes only the single support pin 263.

The coupling portion 264A can rotate about the securing pin 261. Accordingly, the distances between the light sources 22 and the support pins 263 can be adjusted by adjusting the rotational position of the coupling portion 264A, and shadow due to the support pins 263 can be unlikely to stand out. The through-hole of the coupling portion 264A through which the securing pin 261 extends may be an oblong hole. In this case, the distances between the light sources 22 and the support pins 263 can be adjusted by adjusting a position at which the securing pin 261 extends through the through-hole. Each coupling portion 24A may have through-holes. In this case, the distances between the light sources 22 and the support pins 263 can be adjusted depending on a through-hole through which the securing pin 261 extends, among the through-holes.

According to the present embodiment, the securing pin 261 secures the coupling portion 264A to the chassis 41 and secures the mounting substrates 21 to the chassis 41.

Accordingly, the number of components can be smaller than that in the case where the coupling portion 264A is directly secured to the chassis 41.

According to the present embodiment, the coupling portion 264A and the securing pin 261 are separatable from each other. However, the coupling portion 264A and the securing pin 261 may be integrally formed. According to the present embodiment, the coupling portion 264A and the support pins 263 are integrally formed. However, the coupling portion 264A and the support pins 263 may be separatable from each other.

Modification

Modifications to the support members 26A according to the present embodiment will now be described. The modifications described below can be used by appropriately combining features of the embodiment described above or the modifications. In the following description, components like to those according to the embodiment described above are designated by like reference characters, and the description thereof is appropriately omitted.

First Modification

Figure 8:
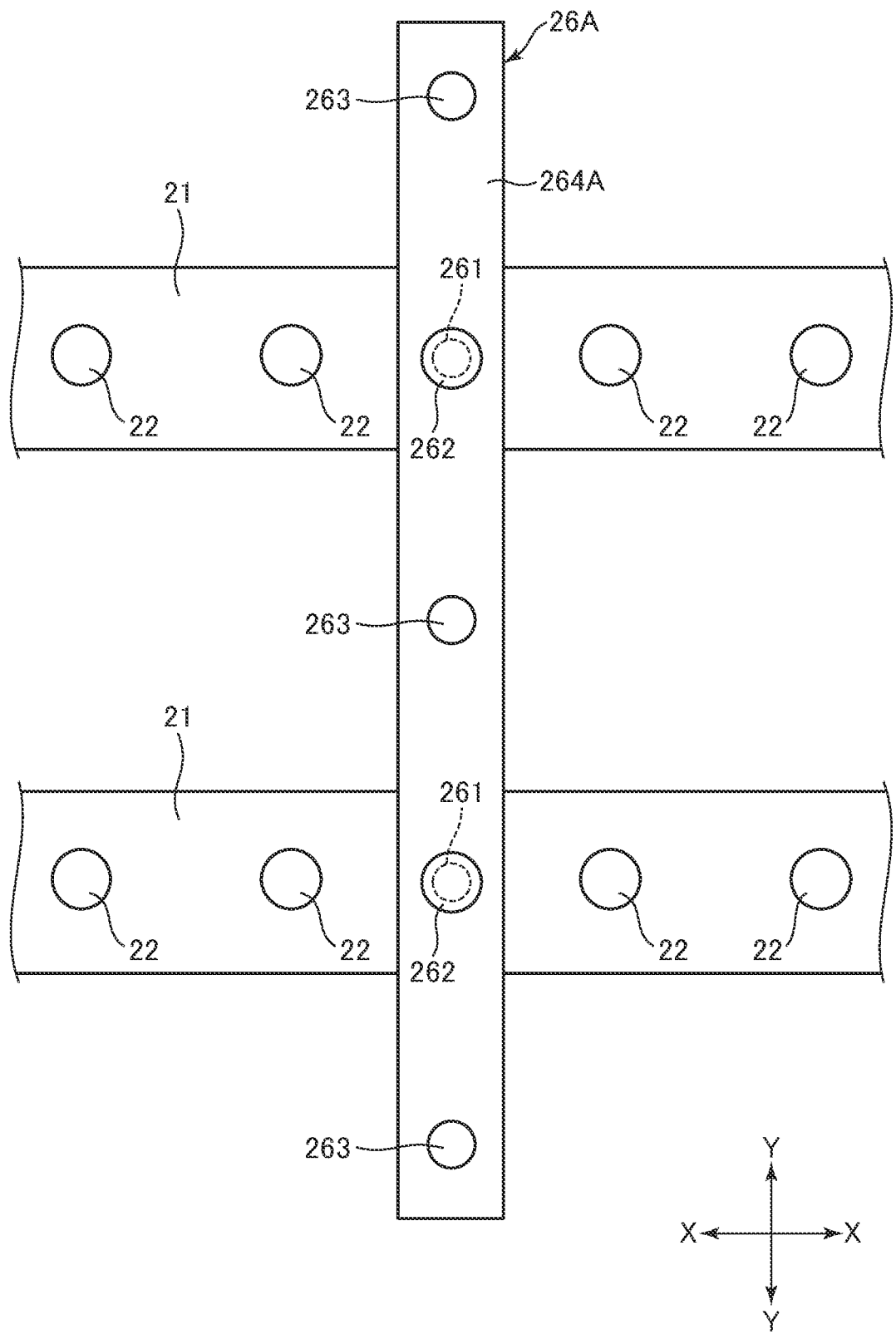
FIG. 8 schematically illustrates a support member of a display device according to a first modification to the second embodiment.

In the example described above, the support members 26A are secured to the respective mounting substrates 21. However, each support member 26A may be secured to multiple mounting substrates 21. As illustrated in FIG. 8, the coupling portion 264A of the support member 26A may extend across two mounting substrates 21 that are arranged in the Y-direction. According to the present modification, the coupling portion 264A includes three support pins 263 and has two through-holes. The three support pins 263 and the two through-holes are alternately disposed in the longitudinal direction of the coupling portion 264A. The coupling portion 264A is secured to the two mounting substrates 21 with the securing pins 261 extending through the respective two through-holes.

Each support member 26A according to the present modification thus extends across the multiple mounting substrates 21. Accordingly, the number of the support members 26A of the display device 69 decreases, and the work efficiency can be improved.

According to the present modification, the coupling portion 264A extends across the two mounting substrates 21 but may extend across three or more mounting substrates 21.

Second Modification

In the example described above, the mounting substrates 21 are disposed inside the grooved portions 411 that are formed on the chassis 41, and consequently, each coupling portion 264A is in contact with the chassis 41. As for a support member 26B according to the present modification, a coupling portion 264B is formed so as to detour the mounting substrate 21, and consequently, the coupling portion 264B is in contact with the chassis 41.

Figure 9:
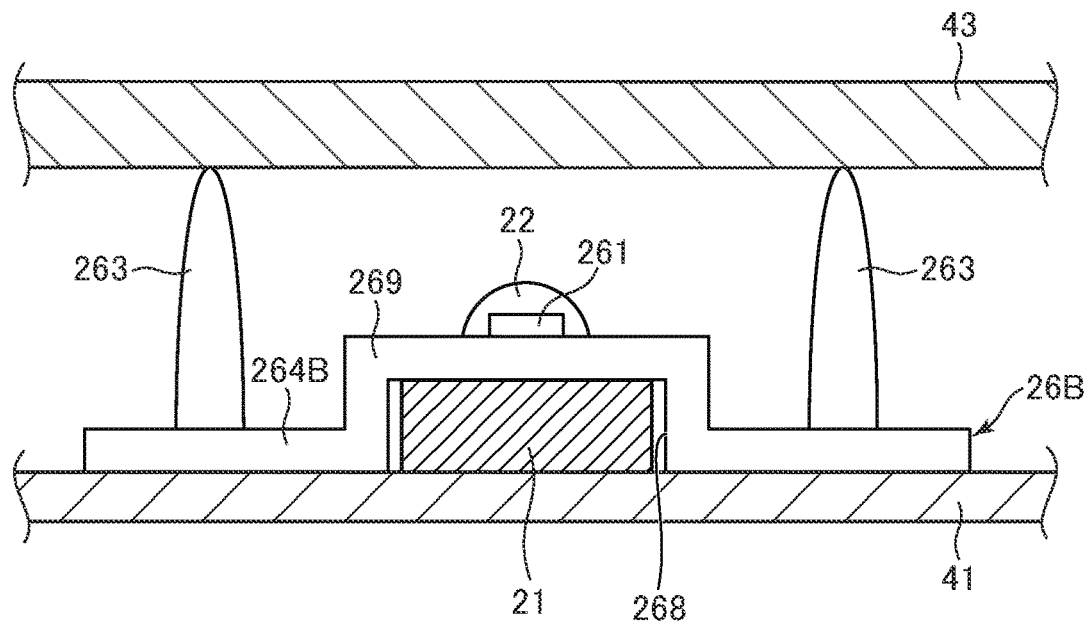
FIG. 9 schematically illustrates a support member of a display device according to a second modification to the second embodiment.

As illustrated in FIG. 9, the coupling portion 264B according to the present modification may include a recessed portion 268. The recessed portion 268 is formed on a surface of the coupling portion 264B that faces the chassis 41. The recessed portion 268 may be recessed toward the diffuser plate 43. The recessed portion 268 is formed at the center of the coupling portion 264B in the longitudinal direction. The recessed portion 268 extends from a side of the coupling portion 264B in the transverse direction to the other side. The dimension of the recessed portion 268 in the longitudinal direction of the coupling portion 264B is longer than the dimension of the mounting substrate 21 in the transverse direction. The depth of the recessed portion 268 is substantially equal to the thickness of the mounting substrate 21 or is slightly greater than the thickness of the mounting substrate 21. A part of the coupling portion 264B at which the recessed portion 268 is formed so as to have a uniform thickness corresponds to a projecting portion 269 that projects toward the diffuser plate 43.

The mounting substrate 21 may extend inside the recessed portion 268 of the coupling portion 264B. In other words, the coupling portion 264B extends across the mounting substrate 21 in the Y-direction such that the mounting substrate 21 extends inside the recessed portion 268 in the X-direction. This enables parts of the coupling portion 264B on which the support pins 263 are disposed to be in contact with the chassis 41. According to the present modification, the distance between each support pin 263 and the chassis 41 is consequently uniform, and the predetermined distance between each mounting substrate 21 and the diffuser plate 43 can be maintained.

Figure 10:
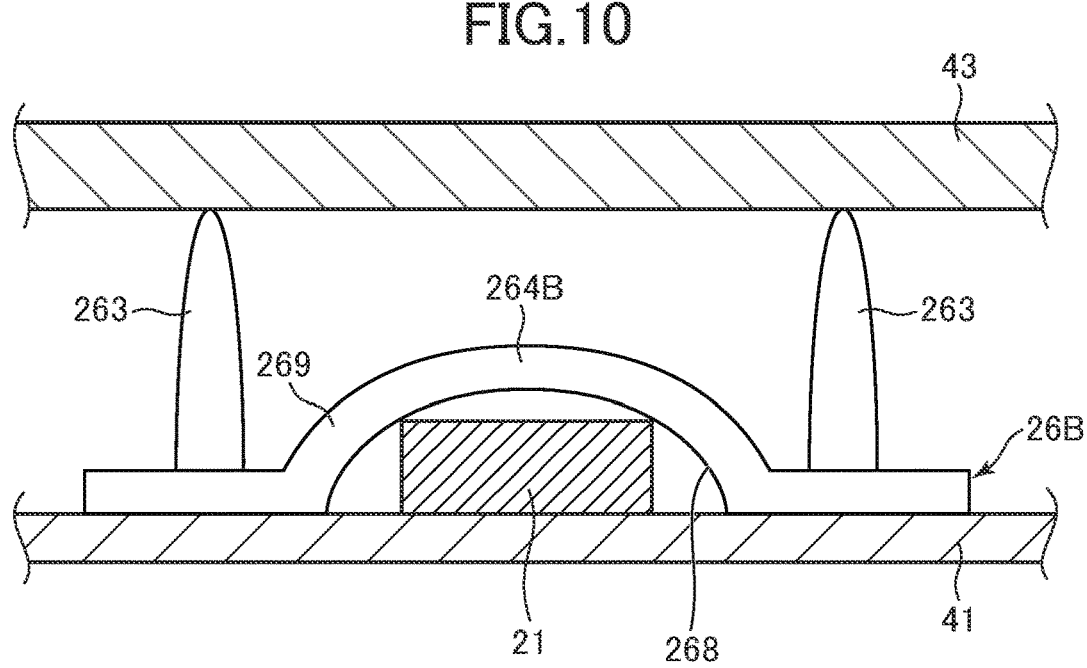
FIG. 10 schematically illustrates another structure of the support member of the display device according to the second modification to the second embodiment.

In an example illustrated in FIG. 9, a surface of the projecting portion 269 is a flat surface. As illustrated in FIG. 10, however, the surface of the projecting portion may be a curved surface. In this case, shadow due to the projecting portion is unlikely to stand out even when the projecting portion is irradiated with the light from the light sources 22, and the light passes through the projecting portion or is reflected from the projecting portion. In FIG. 10, an illustration of, for example, the securing pin 261 and the light source 22 is omitted.

The present disclosure contains subject matter related to that disclosed in Japanese Priority Patent Application JP 2020-102833 filed in the Japan Patent Office on Jun. 15, 2020 and Japanese Priority Patent Application JP 2021-024730 filed in the Japan Patent Office on Feb. 19, 2021, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display device comprising:
   a diffuser plate;
   a plurality of light sources that irradiates the diffuser plate with light;
   a mounting substrate on which the plurality of light sources is mounted;
   a chassis to which the mounting substrate is secured; and
   a support member that is disposed between the chassis and the diffuser plate and that supports the diffuser plate,
   wherein the support member includes a securing pin that is fitted in a hole that is formed in the mounting substrate, a support pin that is located between the diffuser plate and the chassis, and a coupling portion that extends in a plane direction of the mounting substrate and that couples the securing pin and the support pin with each other,
   wherein a plurality of the support pins is present and interposed between the diffuser plate and the chassis,
   wherein the coupling portion couples the securing pin and the plurality of support pins with each other,
   wherein the coupling portion extends in a direction intersecting a longitudinal direction of the mounting substrate and extends across the mounting substrate,
   wherein the chassis has a groove portion recessed in a direction opposite to the diffuser plate, wherein the groove portion has a depth substantially same as a thickness of the mounting substrate, wherein the mounting substrate is provided in the groove portion, and wherein the coupling portion is provided so as to bridge the groove portion.

2. The display device according to claim 1, wherein the mounting substrate is one of a plurality of mounting substrates, and wherein the coupling portion extends across the plurality of mounting substrates.

3. The display device according to claim 1, wherein the coupling portion includes a recessed portion that is recessed toward the diffuser plate, and the mounting substrate extends inside the recessed portion.

4. The display device according to claim 1, wherein the chassis includes a grooved portion, and wherein the mounting substrate extends inside the grooved portion.

* * * * *